No. 693,093. Patented Feb. 11, 1902.
J. F. WHEELER.
BUNCHER ATTACHMENT FOR MOWERS.
(Application filed Apr. 10, 1901.)
(No Model.) 3 Sheets—Sheet 1.
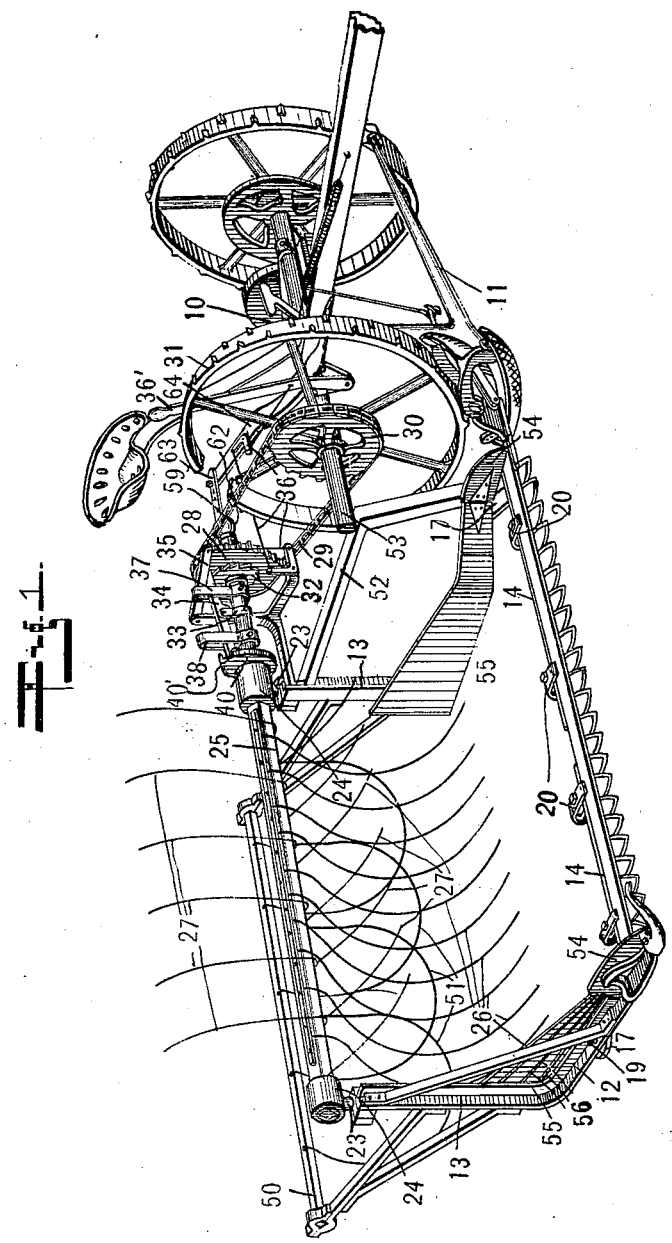
Witnesses
Frank A. Fable
Bertha M. Ballard
Inventor
James F. Wheeler
By
Arthur M. Hood
Attorney No. 693,093. Patented Feb. 11, 1902.
J. F. WHEELER.
BUNCHER ATTACHMENT FOR MOWERS.
(Application filed Apr. 10, 1901.)
(No Model.) 3 Sheets—Sheet 2.
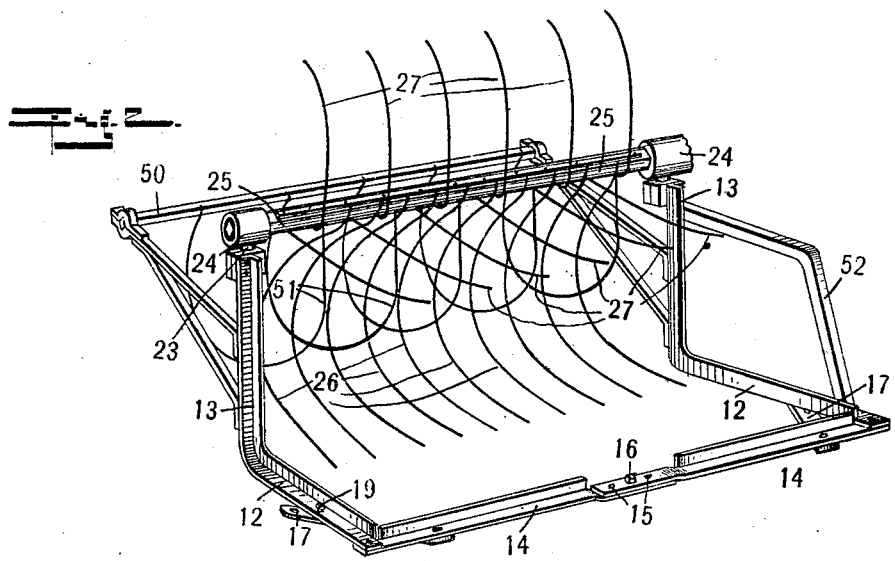
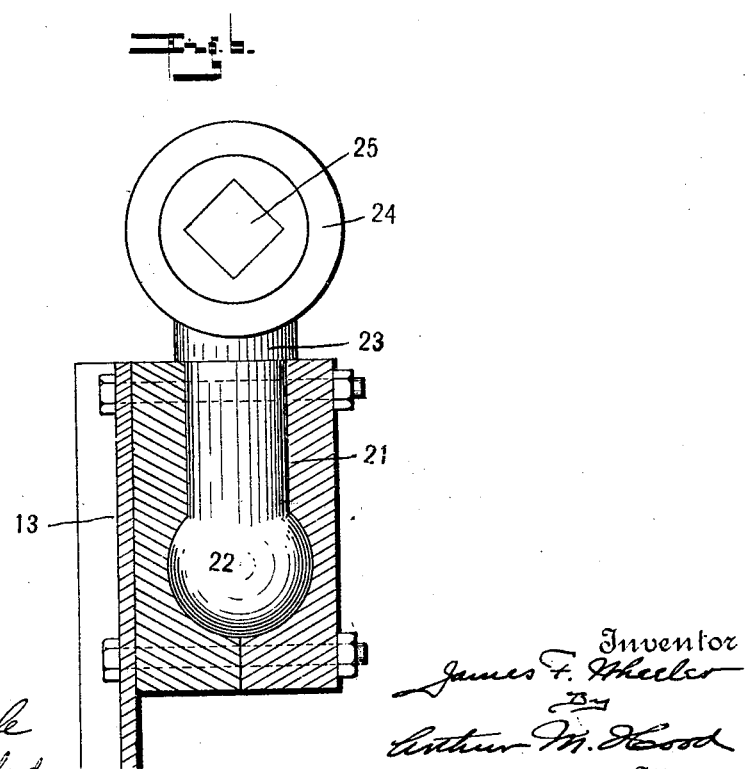

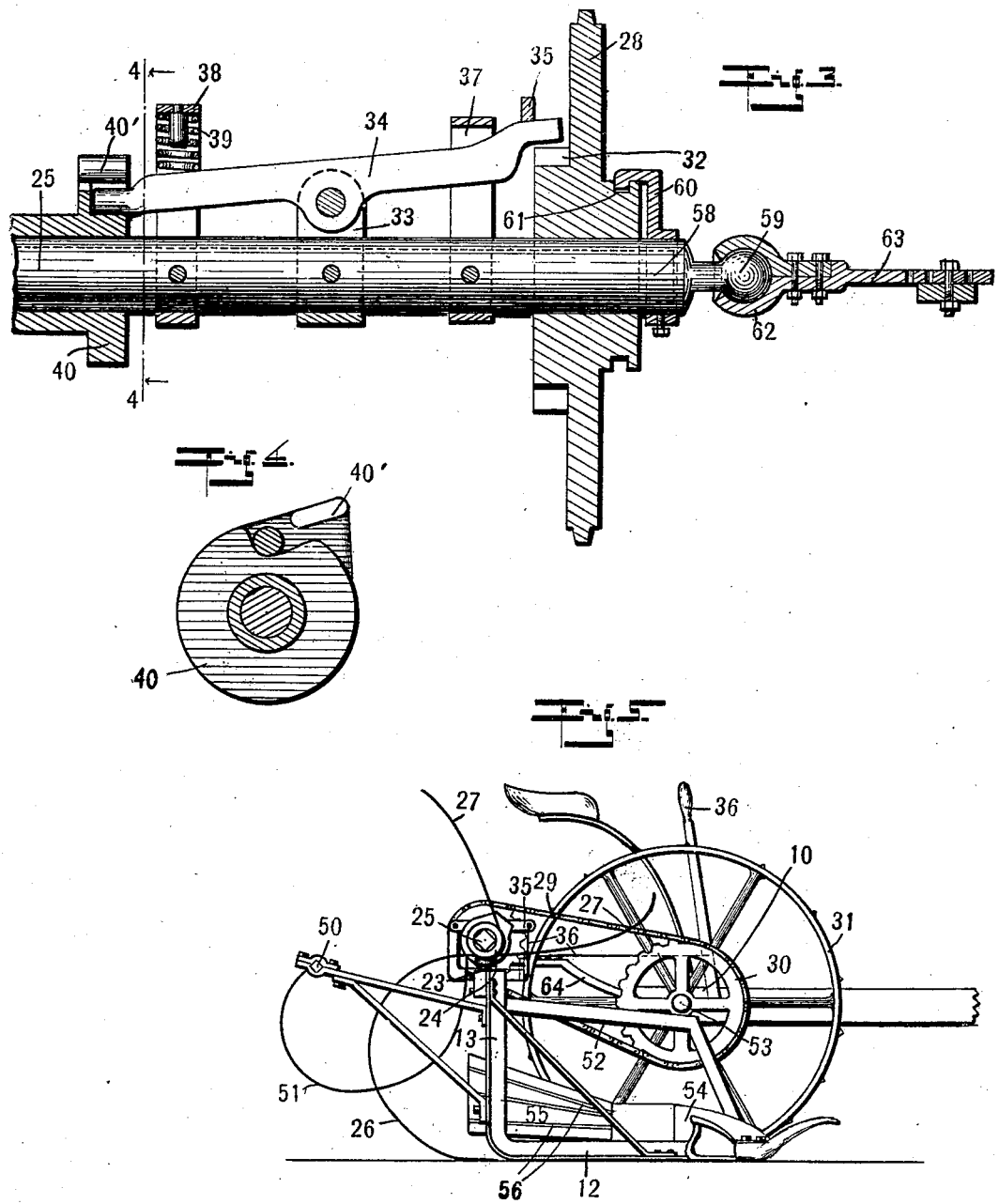

UNITED STATES PATENT OFFICE.

JAMES F. WHEELER, OF PERRY TOWNSHIP, INDIANA, ASSIGNOR OF ONE-HALF TO AUGUSTIN BOICE, OF INDIANAPOLIS, INDIANA.

BUNCHER ATTACHMENT FOR MOWERS.

SPECIFICATION forming part of Letters Patent No. 693,093, dated February 11, 1902.

Application filed April 10, 1901. Serial No. 55,158. (No model.)

*To all whom it may concern:*

Be it known that I, JAMES F. WHEELER, a citizen of the United States, residing in Perry township, in the county of Marion and State of Indiana, have invented a new and useful Buncher Attachment for Mowers, of which the following is a specification.

My invention relates to an improved means for collecting freshly-mowed grass into windrows.

The object of my invention is to produce a cheap, simple, and efficient bunching device which shall be adjustably attached to mowing-machines of different makes and sizes.

The accompanying drawings illustrate my invention.

Figure 1 is a perspective view of my improvement attached to an ordinary mower. Fig. 2 is a perspective view of a portion of the attachment separated from the mower. Fig. 3 is a side elevation of the clutch and automatic stop. Fig. 4 is a section on line 4 4 of Fig. 3. Fig. 5 is an end elevation of the entire attachment. Fig. 6 is a detail of the upper end of one of the uprights.

In the drawings, 10 indicates a mowing-machine of any desired pattern provided with the usual cutter-supporting arm 11.

My improved bunching attachment consists of a pair of rearwardly-extending arms 12, each provided with an upright 13, preferably integral therewith and suitably braced to form a rigid side. Pivoted to the forward end of each arm 12 is a bar 14, the adjacent ends of said bars being arranged to overlap and provided with a series of registering openings 15, through which a suitable fastening 16 may be passed, the arrangement being such that the distance between the forward ends of arms 12 may be regulated by an adjustment of bars 14 upon each other. Pivoted to each bar 14 is a brace 17, the free end of which is provided with holes, through which a fastening means 19 may be passed into the adjacent arm 12. A frame thus formed may be attached to the cutter-bar 11 by means of suitable clamps 20, such as those shown in my Patent No. 626,471. Formed in the upper end of each upright 13 is a socket 21, which is adapted to receive the ball 22 of a vertical stem 23, carried by or formed integral with a bearing-box 24.

Mounted in the two boxes 24 is a rake-bar 25, to which is secured a series of rake-teeth 26. Secured to bar 25 are two sets of packer-teeth 27, the arrangement of rake-teeth and packer-teeth and of means of securing the same to the rake-bar being preferably that shown in my patent mentioned above.

Revolubly mounted upon one end of rake-bar 25 adjacent the mower is a sprocket-wheel 28, arranged to receive a sprocket-chain 29, which also passes around a sprocket 30, preferably detachably secured to the near wheel 31 of the mower 10. Carried upon the outer side of sprocket 28 is a clutch 32. Secured to bar 25 so as to rotate therewith is a pair of ears 33, between which is pivoted a clutch-lever 34, one end of which is adapted to be thrown into engagement with the teeth of the clutch 32 by means of a lever 35 and suitable connections 36 between said lever 35 and an operating-lever 36', mounted upon the mower within easy reach of the driver. The ends of lever 34 lie between suitable guides 37 and 38, which are clamped to rake-bar 25 so as to rotate therewith. Mounted between guides 38 is a spring 39, which engages lever 34 and holds one end of said lever normally out of engagement with clutch 32 and the opposite end in engagement with a cam 40, which is secured to or formed integral with the adjacent box 24. Cam 40 is provided with a lip 40', the purpose of which will appear.

Mounted to the rear of rake-bar 25 and parallel therewith is a bar 50, to which is secured a series of spring-teeth 51, which extend downward, forward, and upward between the rake-teeth 26, the arrangement being such as to prevent the cut material from piling up too high in the pocket formed by the rake-teeth and being also such as to strip the material from the rake-teeth when said teeth are withdrawn from raking position. When lever 34 is thrown into clutch 32, the shock tends to raise the buncher about the pivotal support of the cutter, and in order to keep the buncher down to its work I secure to the inner frame, formed by arm 12 and upright 13, a bar 52, which lies parallel to the adjacent arm 12 and extends beneath an axial finger 53, carried by sprocket-wheel 30. Secured to each arm 12 at its forward end is a guard 54, to the rear end of which is hinged a guard 55, preferably formed of sheet metal smooth upon the inside and suitably strengthened upon the outside by ribs 56. The rear end of each guard 55 extends to the adjacent upright 13.

The rake-bar 25 may be made of wood, and in that case the end upon which sprocket 28 is mounted is provided with a metallic jacket 58, provided upon its end with a ball 59. Sprocket 28 may be kept in axial position upon jacket 58 by any suitable means—as, for instance, a finger 60—secured to the jacket and projecting into a peripheral groove 61, formed in the hub of the sprocket.

In order to brace the rear end of the buncher, I clamp about ball 59 a socket 62, provided with an arm 63, having a series of bolt-holes therethrough, by which said arm may be secured to a bracket 64, secured to the mower 10.

The operation is as follows: In order to attach the buncher to the mower, bars 14 are adjusted upon each other until the distance between the forward ends of arms 12 is substantially equal to the length of the cutter-bar 11, the said arms 12, together with their uprights 13, swinging upon the vertical axes formed by the ball-and-socket joints 21 23. Normally lever 34 is held out of engagement with clutch 32 and into engagement with the lowest point of cam 40, and as the mower is driven forward sprocket 28 is rotated freely upon the rake-bar 25, the material cut by the cutter-bar being gathered by the rake-teeth 26 and being held down close to the ground by the spring-teeth 51. As soon as the point is reached where the operator desires to form a windrow he throws lever 36' so as to draw lever 34 into engagement with clutch 32. The rake-bar 25 is then rotated by sprocket 28 in the direction indicated by the arrows, lever 34 rotating with the rake-bar. The rake-teeth 26 are thus withdrawn rearward and upward, the material being cleared therefrom by the spring-teeth 51 and pressed down upon the ground into a well-formed windrow by the packer-teeth 27. The rake-bar 25 is given a complete revolution, lever 34 being maintained in engagement with clutch 32 by cam 40 until close to the completion of revolution, when cam 40 allows the sudden withdrawal of lever 34 from clutch 32 by means of spring 39. The withdrawal of lever 34 from clutch 32 is insured by lip 40', which engages lever 34 as it nears the lowest point of the cam.

I claim as my invention—

1. In a buncher, the combination with a pair of side frames, of an adjustable connection between the forward ends of said frames, a rake-bar journaled in the rear ends of said frames, and means for rotating said rake-bar.

2. In a buncher, the combination with a pair of bearings, of a rake-bar journaled therein, a pair of side frames one pivotally connected to each bearing, and means for rotating the rake-bar.

3. In a buncher, the combination with a pair of bearings, of a rake-bar revolubly mounted therein, a pair of side frames, a vertical pivotal connection between the rear end of each frame and one of the bearings, and an adjustable connection between the forward ends of the side frames.

4. In a buncher, the combination with a rake-bar carrying a series of rake-teeth, of a series of packer-teeth secured to said bar behind the rake-teeth, means for rotating the rake-bar, and a series of spring-teeth 51 mounted to the rear of the rake-teeth and extending downward, forward and upward between the rake-teeth, substantially as and for the purpose set forth.

5. In a buncher, the combination with the completely-rotatable rake-bar, of a driving-clutch rotatably mounted thereon, a clutch-lever pivotally mounted upon said bar, means for throwing the lever into engagement with the clutch, and means for automatically withdrawing the lever from the clutch immediately upon a complete rotation of the rake-bar.

6. In a buncher, the combination with the completely-rotatable rake-bar, of a driving-clutch rotatably mounted thereon, a clutch-engaging member mounted upon said bar, means for throwing the clutch-engaging member into engagement with the driving-clutch, and a cam formed to engage the clutch-engaging member after it has been thrown into engagement with the driving-clutch and maintain it in engagement with the driving-clutch until the rake-bar makes a complete rotation and then automatically withdraw the clutch-engaging member from the driving-clutch.

7. In a buncher, the combination with the rotatable rake-bar, of a driving-clutch rotatably mounted thereon, a clutch-lever pivotally mounted upon said bar, means for throwing the lever into engagement with said clutch, a cam, and a spring arranged to normally maintain the lever in engagement with said cam, substantially as and for the purpose set forth.

8. In a buncher, the combination with the mower, of a rake-bar and support therefor, means for rotating said rake-bar, and an adjustable ball-and-socket connection between the end of the rake-bar and the frame of the mower.

9. In a buncher, the combination with the mower, of a pair of side frames, a rake-bar revolubly mounted thereon, a driving-gear carried by said rake-bar, a clutch mechanism between said gear and rake-bar, a driving-gear carried by one of the mower-wheels, an axial pin carried by said second driving-gear and projecting immediately above a portion of one of the side frames, and connections between the driving-gears.

10. In a buncher, the combination with the mower, of a pair of side frames, a rake-bar revolubly mounted thereon, a driving-gear carried by said rake-bar, a clutch carried by said gear, a clutch-lever pivotally mounted upon the rake-bar, means to throw said lever into engagement with the clutch, means for automatically withdrawing the lever from the clutch, a driving-gear carried by one of the mower-wheels, an axial pin carried by the second driving-gear and projecting immediately above a portion of one of the side frames, and connections between the driving-gears.

11. In a buncher, the combination with a pair of bearings, of a rake-bar journaled therein, a pair of side frames carrying said bearings, means for swinging one of said frames upon its bearing so as to vary the distance between the forward ends of the side frames, and means for rotating the rake-bar.

JAMES F. WHEELER.

Witnesses:
ARTHUR M. HOOD,
BERTHA M. BALLARD.